Figure 1:
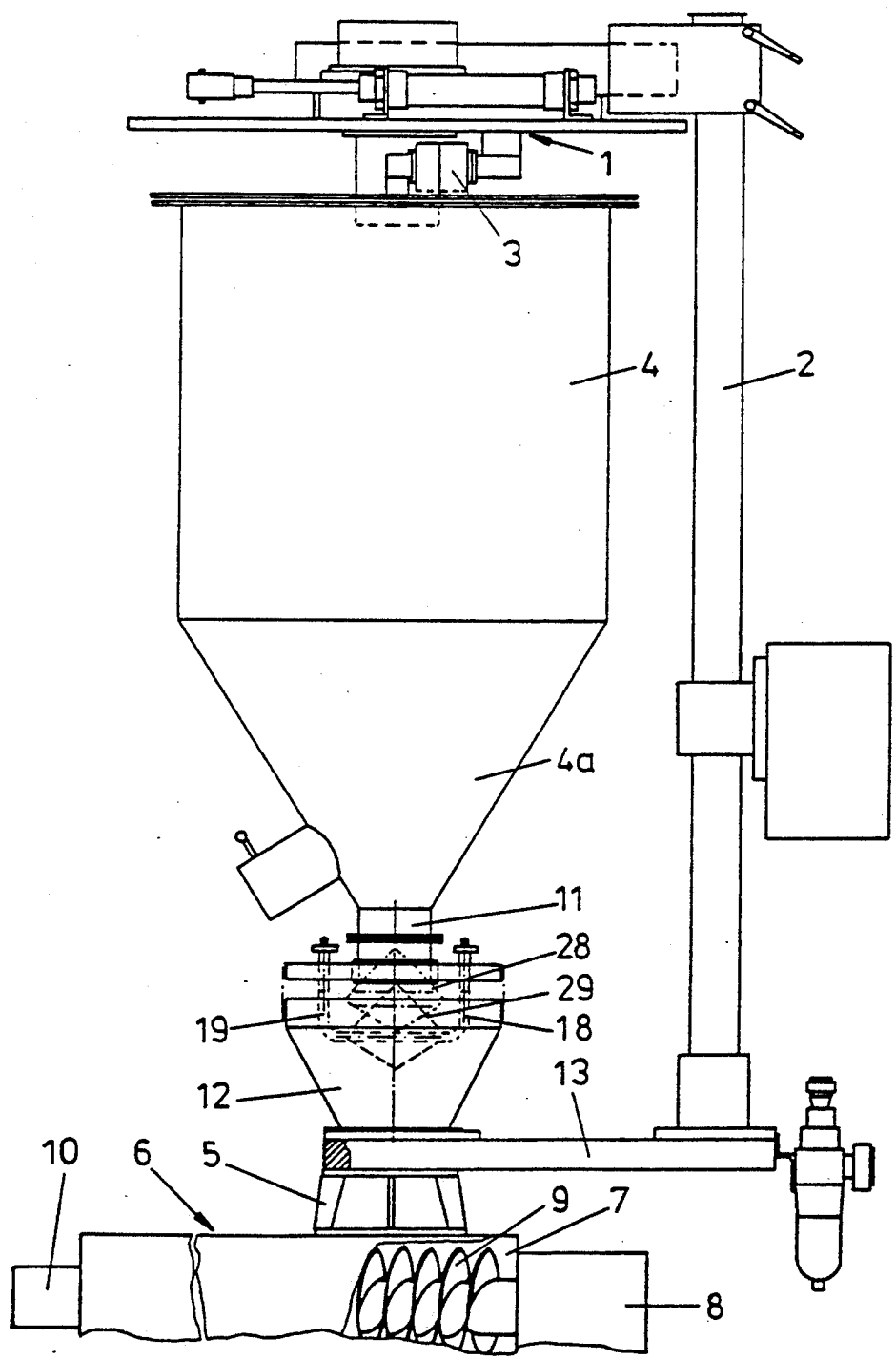

United States Patent
Neumann et al.

Patent Number: 5,161,714
Date of Patent: Nov. 10, 1992

[54] FEED DEVICE FOR BULK MATERIAL IN A MASS THROUGHOUT WEIGHING SYSTEM

[75] Inventors: Ulrich Neumann, Bad Oeynhausen; Roland Riediger, Herford, both of Fed. Rep. of Germany

[73] Assignee: Inoex Innovationen und Ausrüstungen für die Extrusionstechnik, Bad Oeynhausen, Fed. Rep. of Germany

[21] Appl. No.: 654,629
[22] PCT Filed: Sep. 1, 1989
[86] PCT No.: PCT/EP89/01026
§ 371 Date: Apr. 25, 1991
§ 102(e) Date: Apr. 25, 1991
[87] PCT Pub. No.: WO90/02643
PCT Pub. Date: Mar. 22, 1990

[30] Foreign Application Priority Data
Sep. 1, 1988 [DE] Fed. Rep. of Germany ....... 3829623

[51] Int. Cl.$^5$ .................. B29C 47/10; B29C 47/92; G01G 13/18
[52] U.S. Cl. .................. 222/55; 222/63; 222/77; 222/504; 222/559
[58] Field of Search .................. 222/55, 63, 77, 504, 222/518, 564, 559

[56] References Cited
U.S. PATENT DOCUMENTS

| | | | |
|---|---|---|---|
| 2,641,476 | 6/1953 | Keleher | 222/559 X |
| 3,232,486 | 2/1966 | Ofner | 222/55 |
| 3,312,374 | 4/1967 | Whitlock | 222/135 |
| 3,635,377 | 1/1972 | Potvin | 222/435 X |
| 3,790,040 | 2/1974 | Bahr et al. | 222/559 X |
| 4,354,622 | 10/1982 | Wood | 222/55 |
| 4,580,698 | 4/1986 | Ladt et al. | 222/55 |
| 4,756,348 | 7/1988 | Moller | 222/55 X |
| 4,944,428 | 7/1990 | Gmür et al. | 222/55 |
| 5,054,652 | 10/1991 | Oshima et al. | 222/55 X |

FOREIGN PATENT DOCUMENTS

| | | |
|---|---|---|
| 181738 | 5/1986 | European Pat. Off. |
| 342197 | 8/1920 | Fed. Rep. of Germany |
| 2515835 | 6/1976 | Fed. Rep. of Germany |
| 2658141 | 7/1978 | Fed. Rep. of Germany |

*Primary Examiner*—Andres Kashnikow
*Assistant Examiner*—Kenneth DeRosa
*Attorney, Agent, or Firm*—Marmorek, Guttman & Rubenstein

[57] ABSTRACT

The invention relates to a feed device for bulk material, comprising a more particularly funnel-shaped storage tank 4, which is borne freely movable by measuring members 3 as a weighing tank of a mass throughput weighing system and is disposed with its outlet 11 over a conveyor system 6 for the removal of the bulk material. Disposed below the outlet 11 is a conical or pyramidal damming and supporting member 14 for the bulk material which is borne by the storage tank 4 and whose conical or pyramidal apex faces the outlet 11. The conical or pyramidal surfaces 29 cooperate with the edge 28 of the outlet 11 to form a gap on all sides.

8 Claims, 4 Drawing Sheets

FEED DEVICE FOR BULK MATERIAL IN A MASS THROUGHOUT WEIGHING SYSTEM

The invention relates to a feed device for bulk material, comprising a more particularly funnel-shaped storage tank, which is borne freely movable by measuring members as a weighing tank of a mass throughput weighing system and is disposed with its outlet over a conveyor system for the removal of the bulk material.

In a known feed device used for extruders (German Patent Specification 37 05 963 C1) a transition member having an inclined surface is provided between the tapering bottom part of the storage tank and its tubular vertical outlet. On its side facing the outlet the bulk material moving from the storage tank into the transition member breaks off, in this way arriving in the vertical outlet. The result is an uncoupling of the mass flow, which otherwise might lead to measuring errors in weighing the mass throughput. This kind of uncoupling of the mass flow is adequate for the majority of applications. However, it has been found in practice that the asymmetrical discharge of the bulk material is not optimum, since the result is non-symmetrical loadings on the mass throughput weighing system, which as a rule comprises a number of measuring members. There is also the fact that the transition member with the inclined surface which is rigidly disposed on the tank does not allow the metering of the bulk material. If metering is required, so as to underfeed the extruder with bulk material to a varying extent, additional metering devices must be provided, the result being that the technical device is fairly expensive.

Another disadvantage of the prior art device is that bulk materials of low flowability, more particularly finely pulverulent bulk material, may due to several diversions become dammed up during discharge. Attempts have been made to obviate these difficulties by free cross-sections of different sizes in the outlet and in the transition member, but this meant that different transition members and outlets had to be available, in dependence on the bulk material to be processed.

It is an object of the invention to provide a feed device for bulk material which enables the mass throughput to be better determined gravimetrically than previously and also metered, substantially independently of the pourability and flowability of the bulk material.

This problem is solved according to the invention in a feed device of the kind specified by the feature that disposed below the outlet is a conical or pyramidal damming and supporting member for the bulk material which is borne by the storage tank and whose conical or pyramidal apex faces the outlet, its conical or pyramidal surfaces cooperating with the edge of the outlet to form a gap on all sides. Preferably the maximum diameter of the conical or pyramidal damming and supporting member is at least as large as the diameter of the outlet.

Due to the conical or pyramidal shape of the damming and supporting member, in the feed device according to the invention the bulk material is distributed uniformly and free from back-up on all sides. Because of the elimination of the prior art multiple deviation of the bulk material on its way to the outlet, there are no pockets in which bulk material can become stuck, such as were hitherto frequently the cause of undesirable backing-up, more particularly in the case of bulk material of low flowability. B changing the width of the gap on all sides of the damming and supporting member, while maintaining the pouring angle on the damming and supporting member, the bulk material to be discharged can be metered without adverse effect on the uncoupling of the mass flow. No additional metering devices are required which affect discharge, as in the prior art.

It is true that conical closure members for tanks containing bulk material have been known for decades (German Patent Specification 342 197), but those closure members have an exclusively opening and closing function. There is no disclosure of any uncoupling of a mass flow, as is important in the use of mass throughput weighing systems.

A required metering of the quantity of bulk material to be discharged can be performed manually or by a motor if the distance of the damming and supporting body from the outlet is adjustable. For this purpose, preferably the damming and supporting body is suspended from the outlet by means of locking screws. The locking screws can be motor-driven.

It is particularly valuable if, according to a further feature of the invention the motor drive for the locking screws or any other adjusting members is operated by an adjusting signal of an open and closed control system, which obtains an actual value from a mass throughput weighing said system. The inclusion of the motor drive in the control circuit then enables the bulk material which is to be discharged to be gravimetrically metered with high accuracy. The metering is highly accurate because, due to the use of the conical or pyramidal damming and supporting member, an uncoupling of the flow of bulk material is achieved between the storage tank and the conveying device, so that exclusively the bulk material contained in the storage tank is determined by the mass throughput weighing system.

Figure 2:
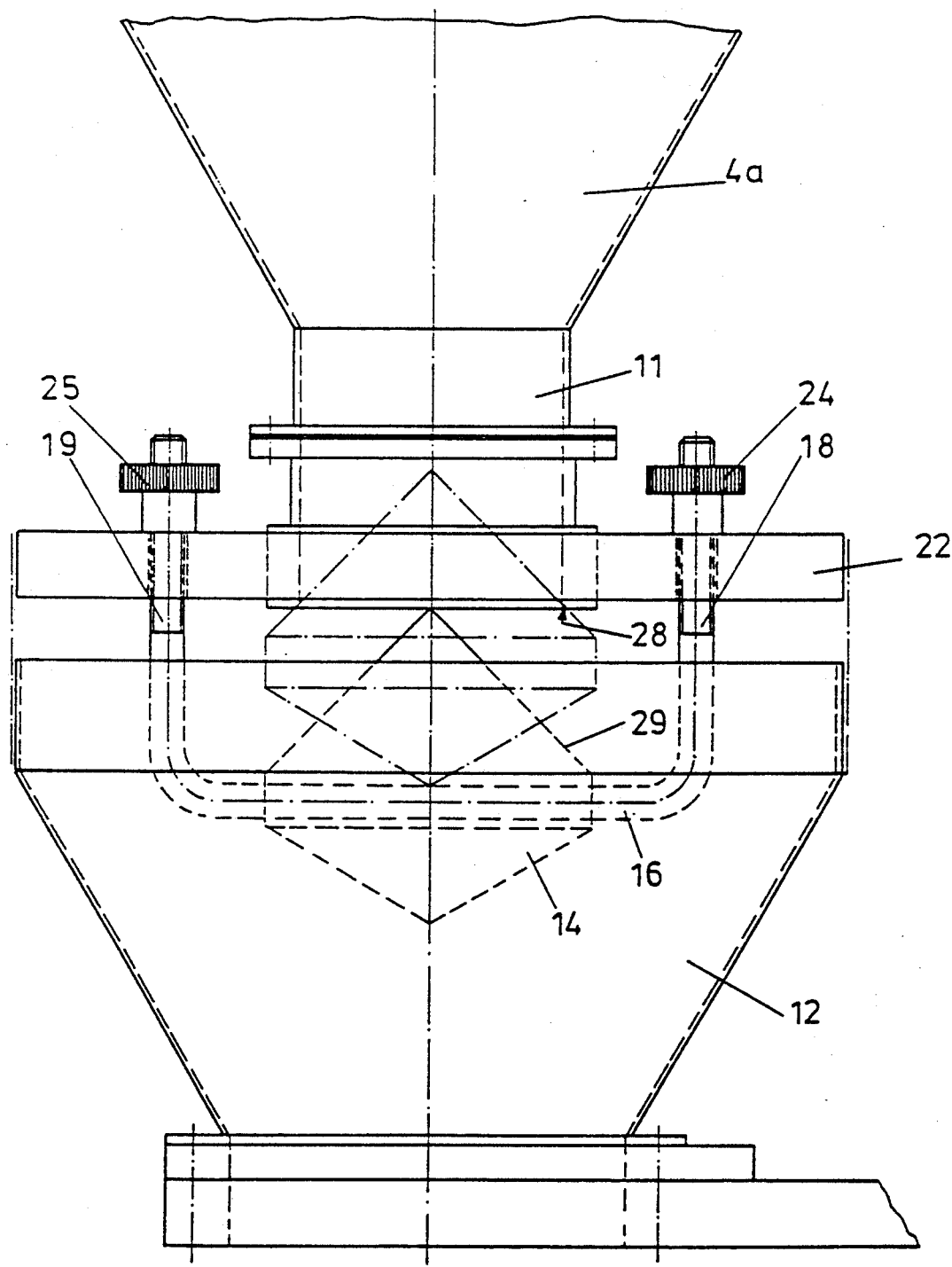
Figure 3:
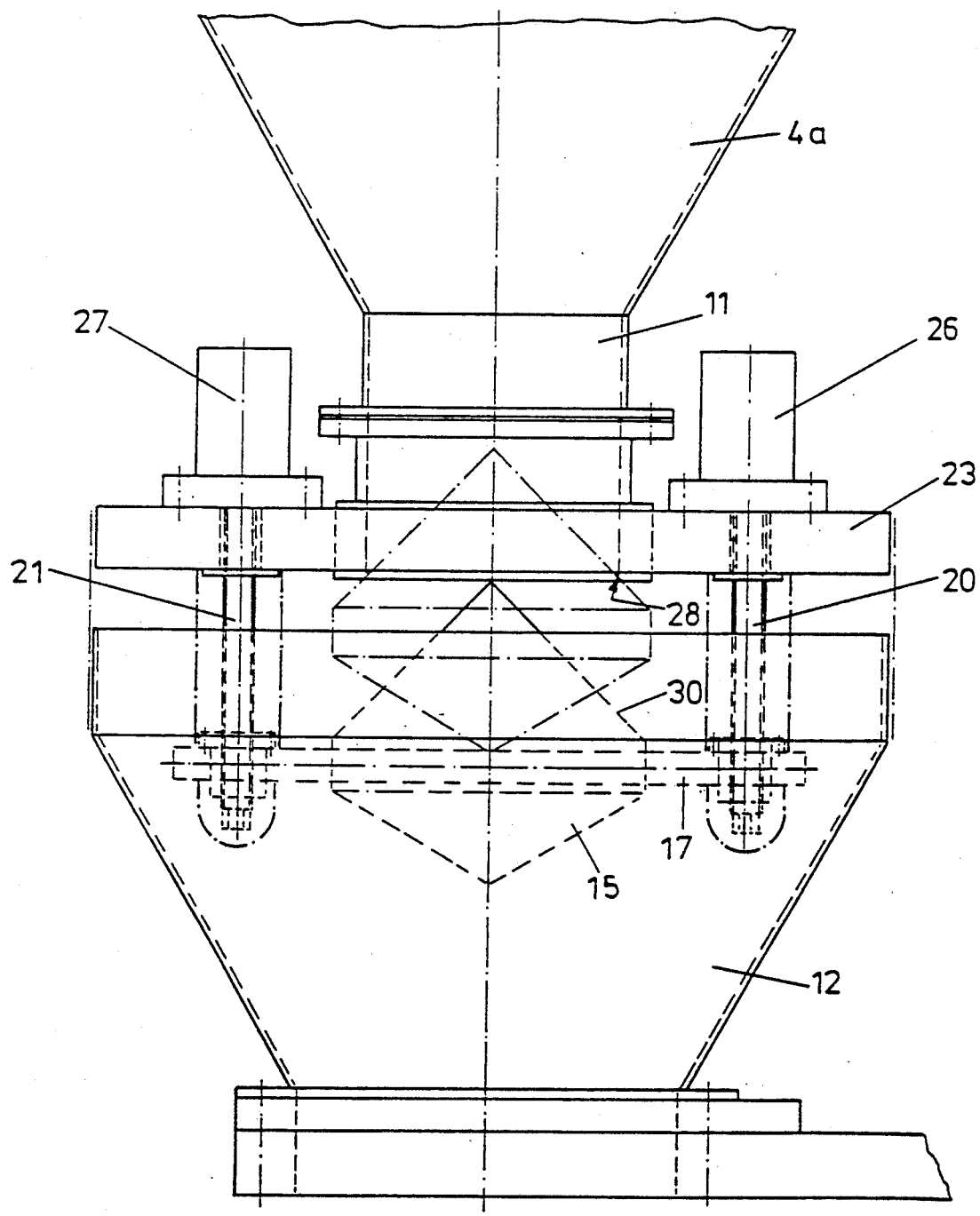
Figure 4:
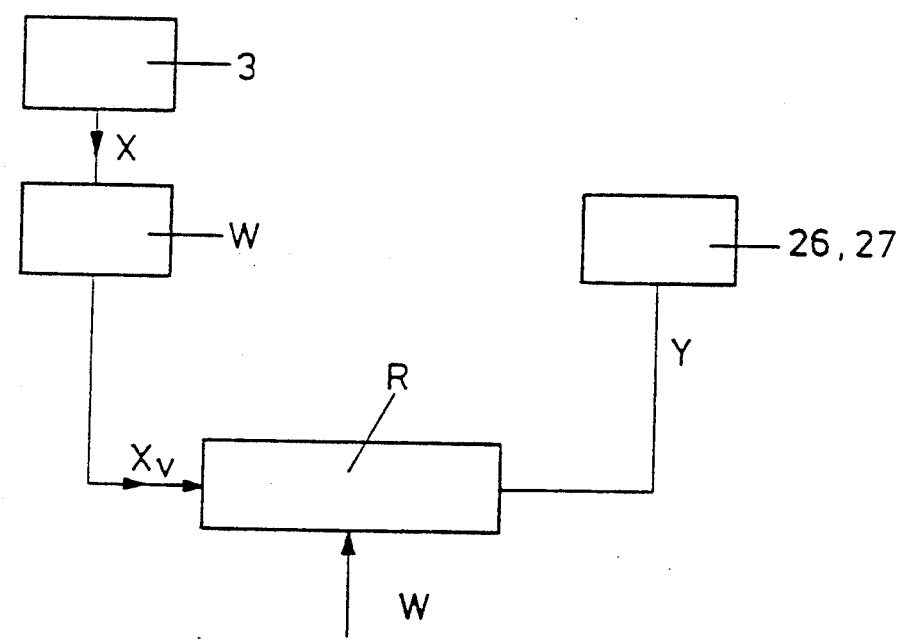

Two embodiments of the invention will now be explained in greater detail with reference to the drawings, wherein:

FIG. 1 is a diagrammatic side elevation of a device for feeding bulk material to an extruder, FIG. 2 is a diagrammatic side elevation of part of a storage tank with its outlet in the feed device illustrated in FIG. 1, FIG. 3 is a diagrammatic side elevation of a part of the storage tank shown in FIG. 1 with its outlet, in a different embodiment from that shown in FIG. 2, and FIG. 4 shows a control circuit for the gravimetric metering of the feed of bulk material in a feed device as illustrated in FIGS. 1 and 3.

Referring to FIG. 1, a storage tank 4 which is constructed in the form of a weighing tank and whose lower part 4a is funnel-shaped and which can be filled from the top with bulk material is suspended via measuring members 3 from a cantilevered arm 1 of an upright 2. The measuring members, disposed in diametrically opposite sides, are elements which respond to bearing. They deliver their measured values through a control system to be disclosed in detail hereinafter (FIG. 4), which comprises an evaluating system for determining the mass throughput. The upright 2 is rigidly connected to inlet 5 of a conveyor unit 6 which in this embodiment comprises a cylinder 7 containing a drilling said screw 9 driven by a drive 8, and a nozzle 10 of an extruder. On its lower part 4a, which tapers funnel-shape, the tank 4 bears a tubular, circular cylindrical outlet 11. The outlet 11 discharges into a funnel 12 which is disposed upstream of the inlet of the conveyor unit 6 and is borne by a cantilevered arm 13 of the upright 2.

The bulk material in the storage tank 4 can flow via the outlet 11 into the funnel 12, from which it passes via inlet 5 into the conveyor unit 6.

As can be seen most clearly from the enlarged details in FIGS. 2 and 3, disposed below the outlet 11 of the storage tank 4 is a conical or pyramidal damming and supporting member 14, 15 which is suspended from cross arms 16, 17 by means of screws 8–21. The screws are retained in a plate 22, 23 retained on the outlet 11. While in the embodiment illustrated in FIG. 2 the damming and supporting member 14 can be adjusted spaced-out from the outlet 11 by means of check nuts 24, 25, in the embodiment illustrated in FIG. 3 it can be adjusted by means of adjusting motors 26, 27. In both embodiments the diameter of the conical or pyramidal damming and supporting member 14 is so dimensioned as to cover the bottom opening of the outlet 11. With a conical damming and supporting body the outlet 11 should be circular cylindrical, while with a pyramidal damming and supporting body it should be adapted to the shape of the pyramid.

In any case, a passage gap for the bulk material is produced between the bottom edge 28 and the surface 29, 30 of the damming and supporting body 14, 15 facing the outlet 11. The damming and supporting member supports a column of bulk material at whose outer edge the bulk material then breaks off in the zone of the passage gap and drops into the funnel 12. In this way the uncoupling of the mass flow takes place, without the possibility of undesirable backing-up taking place at the outlet.

As FIG. 4 shows, depending on the weight, the measuring members 3 deliver signals X to a measured value transducer W, which converts the signal for the mass throughput, for example, into a signal representing the decrease of the weight in the tank 4 per unit of time. The signal $X_v$ for the mass throughput corresponds to the actual value of the controlled condition. A controller R compares the signal $X_v$ with the required value signal W and, in dependence on the comparison, delivers an adjusting signal Y to the adjusting motors 26, 27, by which the quantity of bulk material to be discharged is adjusted. In this way, therefore, the material to be removed can be gravimetrically metered with maximum accuracy.

We claim:

1. A feed device bulk material, comprising a funnel-shaped storage tank which tapers to an outlet, a conveying system below said outlet into which said bulk material is deposited after it leaves said storage tank through said outlet, measuring means on which said storage tank is supported for measuring the rate at which said bulk material leaves said storage tank, damming and storing means disposed between said outlet and said conveying system and cooperating with said measuring means for controlling the rate at which said bulk material leaves said storage tank through said outlet, said damming and storing means being shaped so as to have an apex, outer surfaces, and a base, said damming and storing means being positioned so that said apex projects towards said outlet and so that said surfaces cooperate with an edge of said outlet to form a gap around the outlet through which said bulk material passes, the size of said gap determining the rate of which said bulk material leaves said storage tank, said damming and storing means being completely supported by said storage tank.

2. The feed device of claim 1 wherein said damming and storing means is conically shaped.

3. The feed device of claim 1 wherein said damming and storing means is pyramidally shaped.

4. The feed device of claim 1 wherein said base is at least as wide as said outlet.

5. The feed device of claim 1 wherein the distance between said damming and storing means and said outlet is adjustable.

6. The feed device of claim 1 further comprising locking screws by means of which said damming and storing means is supported on said storage tank.

7. The feed device of claim 6 further comprising motorized drive means for driving said locking screws and thereby adjusting the distance between said damming and storing means and said outlet.

8. The feed device of claim 7 further comprising electronic control means for controlling the degree to which said outlet is opened and closed, said electronic control means being connected to said motorized drive means of said locking screws and controlling the position of said locking screws based upon a signal received from said measuring means indicative of the rate at which said bulk material is leaving said storage tank through said outlet.

* * * * *